(12) United States Patent
Frigo et al.

(10) Patent No.: US 11,974,108 B2
(45) Date of Patent: Apr. 30, 2024

(54) TRACKING AND COMMUNICATION SYSTEM FOR MICROPHONES

(71) Applicant: WISYCOM S.R.L., Tombolo (IT)

(72) Inventors: Enzo Frigo, Tombolo (IT); Massimo Polo, Tombolo (IT)

(*) Notice: Subject to any disclaimer, the term of this patent is extended or adjusted under 35 U.S.C. 154(b) by 117 days.

(21) Appl. No.: 17/660,498

(22) Filed: Apr. 25, 2022

(65) Prior Publication Data
US 2022/0345819 A1 Oct. 27, 2022

(30) Foreign Application Priority Data
Apr. 27, 2021 (IT) .......................... 102021000010547

(51) Int. Cl.
*H04R 5/027* (2006.01)
*H04R 1/02* (2006.01)
*H04W 4/029* (2018.01)

(52) U.S. Cl.
CPC ............ *H04R 5/027* (2013.01); *H04R 1/028* (2013.01); *H04W 4/029* (2018.02)

(58) Field of Classification Search
None
See application file for complete search history.

(56) References Cited

U.S. PATENT DOCUMENTS

| 9,107,020 | B2* | 8/2015 | Betts-Lacroix | H04S 7/30 |
| 9,185,479 | B2* | 11/2015 | Koch | H04R 1/04 |
| 9,666,209 | B2* | 5/2017 | Basson | G10L 25/00 |
| 10,003,903 | B2* | 6/2018 | Dougherty | H04R 5/02 |
| 10,701,508 | B2* | 6/2020 | Hamada | H04S 3/008 |
| 2006/0165245 | A1 | 7/2006 | Niehoff et al. | |
| 2010/0045462 | A1* | 2/2010 | Gibson | H04R 29/007 340/572.1 |

FOREIGN PATENT DOCUMENTS

| JP | 2010028620 A | * | 2/2010 |
| WO | 2006125849 A1 | | 11/2006 |

OTHER PUBLICATIONS

English language translation of JP2010028620A. (Year: 2010).*
Italian Search Report and Written Opinion dated Jan. 26, 2022 from corresponding Application No. IT202100010547.
Shuler Christopher, "L-Acoustics Releases L-ISA Controller v2.0 Software Update and Announces New Tracking System Partners", Live Design Online, Jan. 14, 2020, pp. 1-7.

* cited by examiner

*Primary Examiner* — Paul W Huber
(74) *Attorney, Agent, or Firm* — INNOVATION CAPITAL LAW GROUP, LLP; Vic Lin

(57) ABSTRACT

A tracking and communication system for microphones (10), comprising a plurality of microphones (10) installed in one or more zones (14) of contiguous or separate environments. Each microphone (10) is equipped with a radio unit which is connected to the microphone (10). The tracking and communication system comprises also a network of radio transceivers (11), which are positioned in said one or more zones (14) and which are connected wirelessly or through one or more cable one to each other, being configured to receive signals from said microphones (10) and to transmit to them a plurality of data, and a command and control unit (12), to which said radio transceivers (11) are connected wirelessly or via cables.

6 Claims, 1 Drawing Sheet

TRACKING AND COMMUNICATION SYSTEM FOR MICROPHONES

The present invention relates generally to a tracking and communication system for microphones for professional and non-professional use.

BACKGROUND OF THE INVENTION

Microphone localization is a growing need, especially in the professional field, in order to be able to identify the precise spot where the sound of the person using the microphone is coming from.

Knowing the point from which the sound comes from, especially in the case in which there are more active microphones that collect the sound of several people, musical instruments, etc., allows, for example, to make an advanced recording, according to which each recorded sound is associated with the position at any time.

From this advanced recording, one can then move on to advanced and more faithful reproduction, according to which the sound is reproduced for the listener with appropriate techniques that reproduce the spatiality with which the different sounds were captured.

You can also decide to turn on, mute or change the sound characteristics of the microphone depending on where the microphone is located.

This can be done, according to the present invention, with a communication that uses the same localization system and can act automatically according to predefined rules and through an operator.

The state of the art in this field is based either on the use of Ultra Wide Band (UWB) signals or on the use of arrays of directional microphones. Both techniques mentioned above have disadvantages. For techniques using ultra-wideband signals, for example, the antennas are difficult to design and difficult to place inside the microphone. For techniques that rely on directional microphones, the position that can be estimated has a low accuracy.

SUMMARY OF THE INVENTION

The object of the present invention is therefore to overcome the above-mentioned drawbacks and, in particular, to realize a communication system for microphones, which is able to precisely locate a set of microphones even in complex environments and within buildings and/or rooms (consider a building with several floors and/or with several recording rooms), so as to make commands of various types reach the microphone, either automatically or through the management of an operator. All of this with easy design and placement within the microphone that takes up little space in the system itself, including the antennas.

Another object of the present invention is to realize a tracking and communication system for microphones, which is reliable and effective.

These and other objectives are achieved by a microphone tracking and communication system according to the attached claim 1; further advantages and detailed technical features are contained in the attached dependent claims.

Advantageously, by fixing a reference system, such as by a system of Cartesian axes established at any known point, the present invention allows a set of microphones to be located, each located independently of the other and for the duration of the use of the microphone itself.

In particular, the position of the microphone is identified by a triplet of numbers (x, y, z) representing the distance in each of the x, y, z coordinates with respect to a reference point (x0, y0, z0).

The reference point can be any point in three-dimensional space near the microphone. As an example, let's imagine the use of such a position in large studios, consisting of different rooms on different floors, so that by integrating the three-dimensional description of the studio, the operator can first see the position and determine on which floor and in which room the microphone is located. Secondly, the operator can focus on the specific room and determine the position according to a more precise scale of values.

The position of the microphone is determined by the possibilities offered by many known wireless technologies. Considering, as an example, Bluetooth® technology one can use the phase differences of different signals received from different transmitters or, for newer versions of Bluetooth®, some characteristics inherent to the Bluetooth® system.

With respect to the state of the art, the present invention is based on electromagnetic signals rather than acoustic signals and, in addition, allows commands to be sent via the same communication system in an automatic or operator-managed manner.

Part of the invention is also the possibility, by associating the microphone to the person using it, to identify the position of the person.

This is particularly useful in various situations; one of these situations, by way of example and not exhaustive, provides the possibility to automatically "mute", which means not to transmit the audio signal, when an actor, during the recording of a film, leaves the scene, previously defined in terms of a subset of the three-dimensional space.

BRIEF DESCRIPTION OF THE DRAWINGS

The present invention will now be described, by way of example but not limited to, according to some of its preferred embodiments, and with the aid of the attached figures, wherein.

DETAILED DESCRIPTION OF THE PREFERRED EMBODIMENTS

Figure 1:
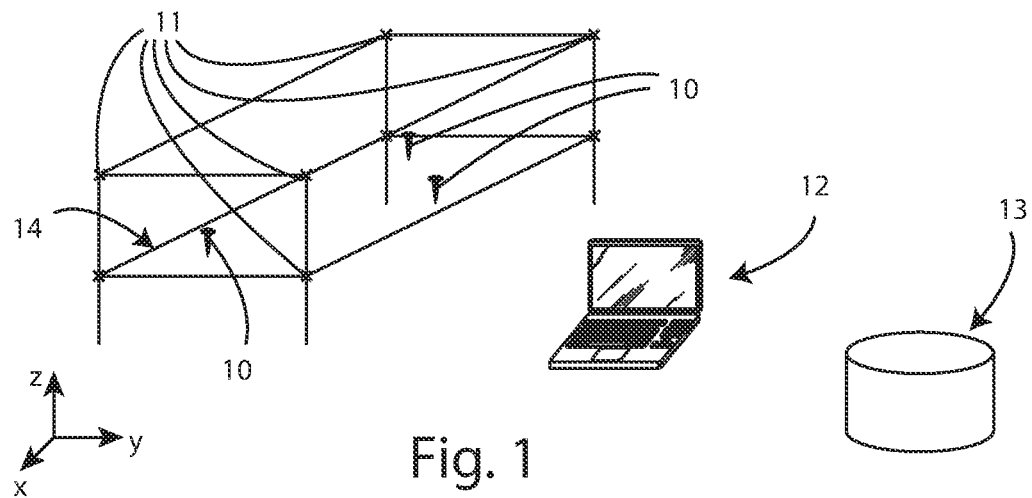
FIG. 1 is a rough block diagram of a tracking and communication system for microphones located outdoors, according to the present invention.
Figure 2:
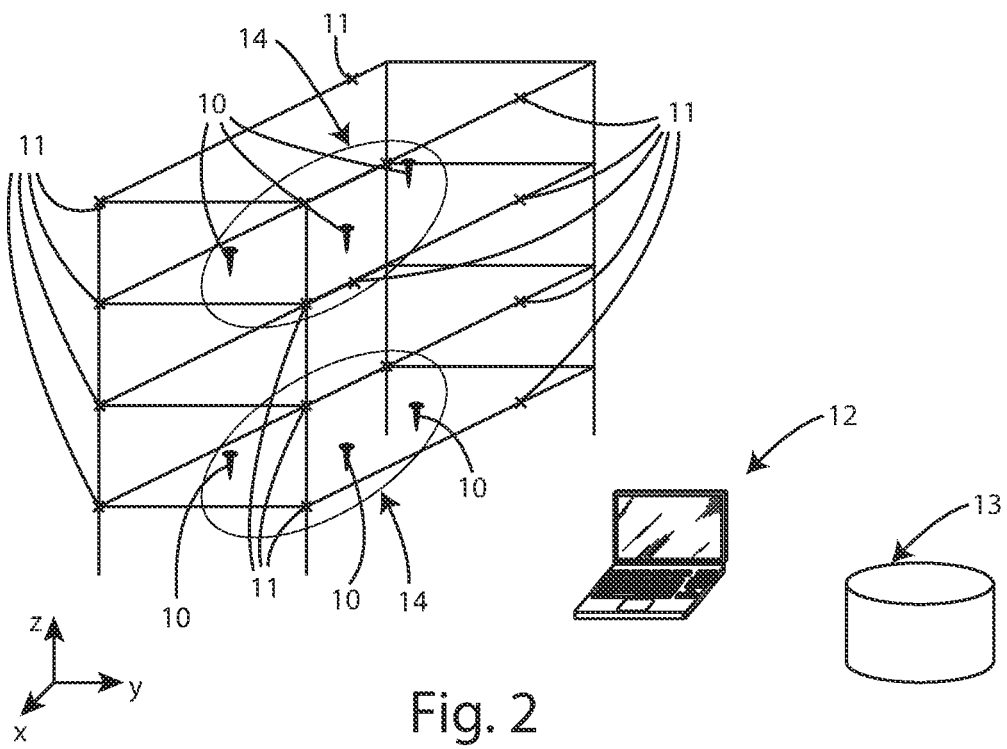
FIG. 2 is a rough block diagram of a tracking and communication system for microphones located inside a building or an environment in general, according to the invention (note, however, that mixed solutions of "indoor" and "outdoor" installations are possible).

With reference to the attached drawings, the tracking and communication system, which is the object of the present invention, includes a plurality of microphones 10, each equipped with a radio unit placed within or connected to the microphone 10, which emits and receives radio signals.

The microphones 10 are installed in one or more zones 14 of an environment, even if they are not contiguous and separated.

The environment may coincide with a room or building, with the outdoor environment or may be of a mixed type (indoor and outdoor).

The tracking and communication system also includes an infrastructure of radio transceivers 11, appropriately located in one or more zone 14 of interest (which may coincide with a stage, building, room, outdoor environment, etc.).

The infrastructure is generally three-dimensional and extends along the X, Y, Z axes, while, in particular cases, it can be two-dimensional and extend along the X, Y axes.

The radio transceivers 11 may be connected together in wireless mode or via one or more cables, depending on the particular zone 14 of interest and practicality of use.

In particular, the radio transceivers 11 are capable of receiving signals from the microphones 10 and also transmitting specific data to them.

In particular, the radio transceivers 11 are capable of transmitting to the microphones 10 a series of data which, in telecommunications jargon, are known as of the "data plane" type, i.e., data which contains information relating to the user of the microphone 10. On the contrary, data of the "control plane" type, which consists of auxiliary information that is intended to operate a particular communication protocol, are not transmitted to the microphones 10, since, according to the present invention, the communication protocol may be chosen from a plurality of protocols available in the state of the art.

With respect to the data of the "data plane" type transmitted to the microphones 10, this type of transmission is particularly useful, for example, in the following situations:

in the case where an actor waiting offstage needs to enter the scene at a specific time decided by the director; in such a case, by sending specific "data plane" data to the microphone 10, the microphone 10 can be made to vibrate so that the actor understands the vibration as a call to enter the scene (note that actors normally wear costumes and the wireless microphone is embedded in the costumes with the voice capture device also placed on the costumes); a similar use of the data can be planned to have the actor leave the scene or perform certain actions during the scene using, for example, a double vibration or other vibration patterns;

in the case where various actors enter and exit a certain zone or scene and it is desired to enable the microphones 10 when the actors enter the scene and disable them when they exit the scene; in such a case, according to the present invention, an automatic rule can be applied to the microphone 10 based on its position after defining the area of the scene;

in the case where, for a specific singer, during a performance, it is desired to dynamically change microphone parameters, including volume and/or other technical parameters; in such a case, according to the present invention, this can be done via specific data sent to the microphone 10 without any manual intervention (note that the microphones 10 are still only adjusted once, for example before the start of a concert, with no possibility of correcting any errors);

in the case where, during a concert, a specific microphone arrangement 10 is used for one song, while another arrangement is needed for the next song; again, according to the present invention, this can be done by sending some data to each singer's microphone 10 based on the identification and position data of the microphone 10; it should also be noted that sending data based on the identification elements of the microphone 10 is subject to errors, while a double check on the identification and position data of the microphone 10 allows substantially to limit the errors.

Advantageously, the system according to the invention comprises, then, a command and control unit 12, to which the radio transceivers 11 are connected, either wirelessly or via cables; the command and control unit 12 allows displaying the position of the microphones 10 on a predefined map, setting automatic operations to be undertaken on the microphones 10 based on their status (which includes, among other characteristic parameters, their position, the status of their battery, etc.) and setting actions by an operator.

Advantageously, the command and control unit 12 comprises several stations controlling the entire set of microphones 10 or parts thereof.

Finally, the tracking and communication system according to the invention comprises one or more "data fusion" centers 13, which, by drawing information from the command and control center 12, couple at any time to the audio of the individual microphone 10 the position of said microphone 10, its status and other information which can then be stored together with the audio and the three-dimensional or two-dimensional description of the environment or zone 14 where the microphones 10 are installed.

Such information can be advantageously used for the purpose of transmitting and/or reproducing sound in a faithful and immersive manner and, in particular, making the listener hear the audio that he would have heard if he had been in a certain position.

From the description made, the objectives of the tracking and communication system for microphones, which is the object of the present invention, are clear, as are its advantages.

Furthermore, the invention thus conceived and illustrated is susceptible to modifications and variants, all falling within the inventive concept of the attached claims, and all details may be replaced by other technically equivalent elements.

Finally, the components used, provided that they are compatible with the specific use, as well as the dimensions, may be any according to the requirements and the state of the art.

Where features and techniques mentioned in the claims are followed by reference marks, such reference marks have been enclosed for the sole purpose of increasing the intelligibility of the claims and, accordingly, have no limiting effect on the interpretation of each element identified by way of example by such reference marks.

The invention claimed is:

1. Tracking and communication system for microphones, comprising a plurality of microphones installed in one or more zones of contiguous or separate environments, characterized in that each microphone is equipped with a radio unit which is placed inside the microphone or which is connected to the microphone, said radio unit being configured to emit and receive radio signals, said tracking and communication system also comprising:

a network of radio transceivers, which are positioned in said one or more zones and which are connected wirelessly or through one or more cable one to each other, each of said radio transceivers being configured to receive signals from each of said microphones and to transmit to said microphones a plurality of data, a command and control unit, to which said radio transceivers are connected wirelessly or via cables, said command and control unit being configured to display a position of each of said microphones on a predefined map, so as to set automatic operations on said microphones according to their operating status and according to their position and so as to set manual actions on said microphones by an operator.

2. Tracking and communication system for microphones as in claim 1, characterized in that said network of radio transceivers is a three-dimensional or two-dimensional network.

3. Tracking and communication system for microphones as in claim 1, characterized in that said command and control unit includes a plurality of stations which control all said microphones or some microphones.

4. Tracking and communication system for microphones as in claim 1, characterized in that said tracking and communication system comprises one or more data fusion centers, which are configured both to receive data and information from said command and control unit and to couple at any time data on the position and on the status of a single microphone to the audio of said single microphone.

5. Tracking and communication system for microphones as in claim 1, wherein the position of each of said microphones is identified by a triplet of numbers (x, y, z) representing a distance in each of x, y, z coordinates with respect to a reference point.

6. Tracking and communication system for microphones as in claim 1, wherein the position of each of said microphones is identified by a phase differences of different signals received at each of the radio transceivers.

* * * * *